United States Patent [19]

Sagishima et al.

[11] 4,300,155
[45] Nov. 10, 1981

[54] PAL DEMODULATOR HAVING NON-SYNCHRONIZED LINE SWITCH

[75] Inventors: Takayuki Sagishima, Suita; Teruo Kitani, Takatsuki, both of Japan

[73] Assignee: Matsushita Electric Industrial Co., Ltd., Osaka, Japan

[21] Appl. No.: 139,223

[22] Filed: Apr. 11, 1980

[30] Foreign Application Priority Data

Apr. 19, 1979 [JP] Japan .................................. 54-48799
Feb. 15, 1980 [JP] Japan .................................. 55-18351

[51] Int. Cl.³ .......................................... H04N 9/50
[52] U.S. Cl. ................................................ 358/24
[58] Field of Search ...................................... 358/24

[56] References Cited

FOREIGN PATENT DOCUMENTS 1395491 5/1975 United Kingdom .................. 358/24

Primary Examiner—John C. Martin
Attorney, Agent, or Firm—Wenderoth, Lind & Ponack

[57] ABSTRACT

In the PAL system, the demodulating axis for one of the two color difference signals, i.e. the R−Y signal, is transmitted switched in phase 180° at each horizontal scanning period. In order to reproduce this signal, a demodulator circuit for color television signals is provided for producing a R−Y signal of the correct polarity, using a line switching signal not controlled by the phase of the transmission signal, and having a frequency half that of the horizontal frequency.

4 Claims, 4 Drawing Figures

PAL DEMODULATOR HAVING NON-SYNCHRONIZED LINE SWITCH

This invention relates to a demodulator circuit for color television signals of the PAL system.

As is well known, in the PAL system, the demodulating axis for one of the two color difference signals, i.e. the (R−Y) signal, is transmitted switched in phase 180° at each horizontal scanning period (below referred to as 1H). In order to demodulate the transmission signal at the correct polarity, a switch operating at a frequency half that of the horizontal frequency (below referred to as $f_H/2$) and changing over with each 1H is used. A flipflop dividing the horizontal pulse in two is used to drive this, and a line switching signal of $f_H/2$ is generated. The phase of the $f_H/2$ line switching signal is maintained in a proper relationship with the transmission line information sent by the color synchronizing signal through the control of the flipflop, as is also generally known. In such a circuit, as mentioned in patent appln. No. 49-4566, there is the shortcoming that the PAL switch stops forever in an attempt to control the phase of the $f_H/2$ line switching signal.

The object of this invention is to provide a demodulator circuit for color television signals which is able to accurately demodulate the (R−Y) signal without controlling the phase of the line switching switch of $f_H/2$.

This object is achieved according to this invention by providing a color demodulator circuit for color television signals in the PAL system, comprising: a (R−Y) demodulator;

a switch means supplied with (1) a carrier chrominance signal in (R−Y) axis, (2) a further carrier chrominance signal the same as said carrier chrominance signal except that the polarity of the latter is reversed from that of the former, (3) a burst signal having (R−Y) axis component, and (4) a further burst signal the same as said burst signal except that the polarity of the latter is reversed from that of the former, said switch means having a switch control terminal supplied with a switch control signal for controlling the switching operation of said switch means, so that said switch means outputs either both of said carrier chrominance signal and said burst signal or both of said further carrier chrominance signal and said further burst signal, the thus outputted carrier chrominance signal and further carrier chrominance signal being fed to an input terminal of said (R−Y) demodulator;

a further switch means supplied with a reference subcarrier in (R−Y) axis and a further reference subcarrier the same as said reference subcarrier except that the polarity of the latter is reversed from that of the former, said further switch means having a switch control terminal supplied with a switching pulse train having a frequency ($f_H/2$) of half of horizontal scanning frequency, so that said further switch means alternately outputs said reference subcarrier and said further reference subcarrier to a further input terminal of said (R−Y) demodulator so as to demodulate the carrier chrominance signal inputted to said (R−Y) demodulator; a control circuit having two input terminals and an output terminal, one input terminal being supplied with said burst signal or said further burst signal from said switch means, the other input terminal being supplied with said reference subcarrier or said further reference subcarrier, said output terminal of said control circuit being coupled to said switch control terminal of said switch means, said control circuit having a discrimination function of discriminate between (a) the phase of said burst signal or said further burst signal from said switch means and (b) the phase of said reference subcarrier or said further reference subcarrier from said further switch means so as to produce, as said switch control signal to said switch means, an output signal having alternative one of two levels for causing an output signal of said (R−Y) demodulator to have a correct polarity.

According to a further developement of this invention, said switch means comprises: a first switch having two input terminals supplied with said carrier chrominance signal and said further carrier chrominance signal, respectively, and also having a switch control terminal coupled to said switch control terminal of said switch means, so as to output, to said input terminal of said (R−Y) demodulator, either said carrier chrominance signal or said further carrier chrominance signal under the control of said switch control signal; and a second switch having two input terminals supplied with said burst signal and said further burst signal, respectively, and also having a switch control terminal coupled to said switch control terminal of said switch means, so as to output, to said one input terminal of said control circuit, either said burst signal or said further burst signal under the control of said switch control signal.

According to a still further development of this invention, said further switch means comprises: a third and a fourth switch each having two input terminals supplied with said reference subcarrier and said further reference subcarrier, respectively, and also each having a switch control terminal coupled to said switch control terminal of said further switch means, so that said third switch outputs, to said input terminal of said (R−Y) demodulator, either said reference subcarrier or said further reference subcarrier, and said fourth switch outputs, to said other input terminal of said control circuit, either said reference subcarrier or said further reference subcarrier.

According to a yet further development of this invention, said control circuit comprises: a phase discriminator having said discrimination function; and a flipflop to produce, as said switch control signal to said switch means, an output signal having said alternative one of said two levels.

Below, a detailed explanantion is given of this invention in reference to figures showing a sample application, wherein.

Figure 1:
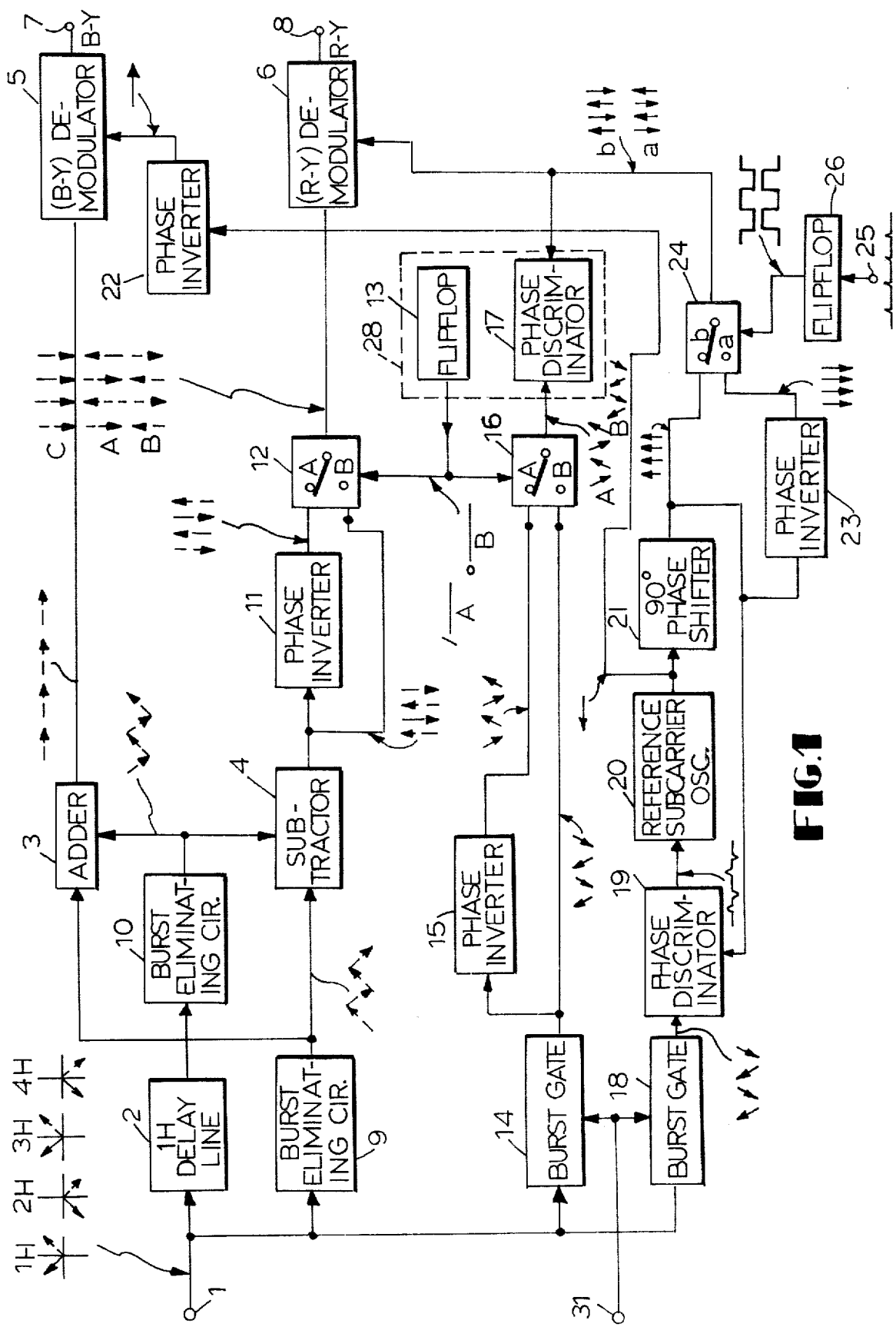
FIG. 1 is a block diagram of a demodulator circuit for color television signals, a first example in this invention.

In FIG. 1, 1 is the input terminal of the chrominance signal extracted from the PAL type color television signals. This is supplied with a burst signal (shown by solid line) and a carrier chrominance signal (shown by broken line; chrominance being abbreviatedly expressed as chrom. hereafter) reversed in polarity from the (R−Y) axis with every 1H. This input carrier chrom. signal is delayed by exactly 1H period at the 1H delay circuit 2 and is applied to the adder 3 and subtracter 4 along with the original input carrier chrom. signal, where mutual addition and subtraction are performed. As a result, a (B−Y) axis carrier chrom. signal can be obtained from the adder 3 and this is supplied to the (B−Y) demodulator. On the other hand, a ±(R−Y) axis carrier chrom. signal reversing in polarity each 1H can be obtained from subtracter 4, and this is supplied to the (R−Y) demodulator 6 via the later described switching circuit. The means for this delay and arithmetic calculation are public. The numbers 7 and 8 are the output terminals of the (B−Y) signal and (R−Y) signal. However, in this circuit, burst eliminating gates 9 and 10 are provided before the input carrier chrom. signal and the delayed carrier chrom. signal are supplied to the adder 3 and subtracter 4 to remove the burst signals beforehand and prevent the occurrence of burst components inside the outputs of adder 3 and subtracter 4.

The carrier chrom. signal of the ±(R−Y) axis of the output of subtracter 4 is reversed in polarity by phase inverter 11; its direct carrier chrom. signal and inverted carrier chrom. signal are respectively supplied to the two input terminals A and B of the first switch 12; and the carrier chrom. signal of the output is supplied to the (R−Y) demodulator 6. The first switch is a static switch operating only once when necessary in accordance with the switch control signal (or switching signal) from the flipflop 13.

On the other hand, only the burst signal is withdrawn from the input signal, supplied to the input terminal 1, by the burst gate 14. This burst signal is also inverted in polarity at the phase inverter 15, and its direct burst signal and inverted burst signal are respectively supplied to the two input terminals A and B of the second switch 16. This second switch operates coupled with the first switch 12 according to the switch control signal (or switching signal) from the flipflop 13.

At this time, the first and second switches 12 and 16 are set to operate so that a burst signal of a polarity corresponding to that of the carrier chrom. signal of the output of the first switch 12 appears from the second switch 16. For example, when a carrier chrom. signal of the ±(R−Y) axis is outputted from the first switch 12, a burst siganl having a ±(R−Y) axis component appears from the second switch 16 too. When set this way, it is possible to express the polarity of the carrier chrom. signal of the output of the first switch 12 by the polarity of the burst signal of the output of the second switch 16. Flipflop 13, which operates the first and second switches, is designed to reverse them exactly once when detecting a mistaken demodulating polarity by using the later discussed phase discriminator 17. Switches 12 and 16 are not operated when the demodulating polarity is correct.

Next, an explanation is given of the section generating the reference subcarrier for demodulation. First, just the burst signal is extracted from the input signals applied to input terminal 1 by the burst gate 18. The burst signal is then applied to the oscillating phase control loop, which is composed of the phase discriminator 19, the reference subcarrier oscillator 20, and the 90° phase shifter 21. This circuit is well known. The oscillator 20 is controlled so as to continuously oscillate at the average phase of the burst signal, and generates the reference subcarrier of the −(B−Y) axis. Here, it is possible to reverse the polarity of this at the phase inverter 22 and to supply it to (B−Y) demodulator 5 as the (B−Y) axis reference subcarrier, and thus to demodulate the (B−Y) signal.

On the other hand, the output of the oscillator 20 is shifted at the 90° phase shifter 21 and supplied to the phase discriminator 19 as the reference subcarrier of the phase of the +(R−Y) axis for the control of the oscillating phase. Along with this, the reference subcarrier of the phase of the −(R−Y) axis, reversed in polarity at phase inverter 23, is taken. These reference subcarriers of the ±(R−Y) axis phase are supplied to the two input terminals (a) and (b) of the third switch 24 respectively. The third switch 24 is operated each 1H by the switching signal of the frequency of $f_H/2$ from flipflop 26, which is inverted each 1H by the horizontal pulse (horizontal synchronizing pulse or horizontal flyback pulse) supplied from the horizontal pulse input terminal 25. The reference subcarrier of the +(R−Y) axis phase and the reference subcarrier of the −(R−Y) axis phase are alternately extracted each 1H and supplied to the (R−Y) demodulator 6.

However, in this circuit, there is a difference between conventional types in that no control at all is exercised over the switching polarity of the third switch 24 and the flipflop 26. The polarity of the reference subcarrier of the output of the third switch 24 differs according to with which polarity the switching signal of the output of the flipflop 26 starts, becoming the polarity of either a or b as shown in FIG. 1. Which it becomes is not stipulated. However, in order to demodulate the (R−Y) signal correctly at the (R−Y) demodulator 6, it is necessary that the polarity of the carrier chrom. signal applied from the first switch 12 and the polarity of the reference subcarrier applied from the third switch 24 match correctly. When, as stated above, it is not known which polarity the standard subcarrier from the third switch 24 will assume—i.e. a or b—there is the danger that the two polarities will not match. In this circuit, the polarity of the reference subcarrier supplied from the third switch 24 to the (R−Y) demodulator 6 is compared with the burst signal obtained from the second switch 16 (the polarity of this burst signal refers, as mentioned above, to the polarity of the carrier chrom. signal supplied from the first switch 12 to the (R−Y) demodulator 6) at the phase discriminator 17. If the two polarities do not match, a switching pulse is generated from the phase discriminator 17 and flipflop 13 is inverted. The first and second switches 12 and 16 are changed to the opposite side and the polarity of the carrier chrom. signal being sent to the (R−Y) demodulator 6 is changed. In this way, the two polarities are made to match and correct (R−Y) demodulation is performed.

A more detailed explanation of this operation is provided below. Suppose now that, as shown in FIG. 1, input terminal 1 receives as input the carrier chrom. signal modulated at the +(R−Y) axis at the first 1H and the carrier chrom. signal modulated at the −(R−Y) axis at the second 1H. Assuming that, the polarity of the carrier chrom. signal supplied from the first switch 12 to the (R−Y) demodulator 6 becomes −, +, −, + (first 1H, second 1H, third 1H, fourth 1H, same below) when the first switch 12 is switched to the input terminal A side or becomes +, −, +, − when the first switch 12 is switched to the input terminal B side. Together with this, the polarity of the burst signal supplied from the second switch 16 to the phase discriminator 17 also becomes −, +, −, + when the second switch 16 is switched to the input terminal A side or becomes +, −, +, − when switched to the input terminal B side. On the other hand, the polarity of the reference subcarrier supplied from the third switch 24 to the (R−Y) demodulator 6 and the phase discriminator 17 becomes −, +, −, + when the third switch 24 is first switched from the input terminal a side or becomes +, −, +, − when first switched from the input terminal b side.

Now, consider as state (1) the case when the first and second switches 12 and 16 are switched to the A side and the third switch 24 is first switched from the a side. At this time, the polarity of the burst signal and the carrier chrom. signal of the output of the No. 1 and No. 2 switches 12 and 16 and the polarity of the subcarrier of the output of the third switch 24 are −, +, −, + and the two match. Therefore, no switching pulse is generated from the phase discriminator 17 and correct (R−Y) demodulation is performed in that switching state. Conversely, in state (2) when the first and second switches 12 and 16 are switched to the B side and the third switch 24 is first switched from the b side, the two polarities become a matching +, −, +, − and correct (R−Y) demodulation is performed.

However, in state (3), when the first and second switches 12 and 16 are switched to the A side but regardless of this the third switch 24 is switched first from the b side, the polarity of the burst signal and the carrier chrom. signal of the output of the first and second switches 12 and 16 becomes −, +, −, + and the polarity of the reference subcarrier of the output of the third switch becomes +, −, +, −. Correct (R−Y) demodulation therefore becomes impossible. Now, in this case, the phase discriminator 17 detects the fact that the polarity of the burst signal from the second switch 16 is − at the first 1H and that the polarity of the reference subcarrier from the No. 3 switch is +, i.e. that they don't match, then generates a switching pulse, reverses the flipflop 13, and changes the first and second switches 12 and 16 to the B side. When this is done, the polarity of the burst signal and the carrier chrom. signal of the output from the first and second switches 12 and 16 becomes −, +, − starting from the second 1H, matching with the −, +, − polarity of the reference subcarrier from the third switch 24 and allowing subsequent correct (R−Y) demodulation. Thus the polarity of the output of the first switch 12 at this time becomes −, −, +, −. Since the two polarities match from the second 1H, no more switching pulses are generated from the phase discriminator 17 and correct (R−Y) demodulation can be continued just as in the case of state (2) mentioned above.

In state (4), when the first and second switches 12 and 16 are switched to the B side and regardless of this the third switch 24 is switched first from the a side, the polarities of the two signals again do not match. In this case, too, a switching pulse is generated from the phase discriminator 17 at the first 1H, the flipflop 13 is inverted, and the first and second switches 12 and 16 are changed to the A side. Through this, starting from the second 1H the same thing occurs as with the above mentioned state (1) and correct (R−Y) demodulation becomes possible.

In this way, this circuit has no need of any control over the switching polarity of the third switch 24, which is changed at each 1H. When the polarity of the reference subcarrier and the polarity of the carrier chrom. signal going to the (R−Y) demodulator 6 do not match, the first and second switches 12 and 16 only have to be changed once so as to allow matching of the two polarities. It thus becomes possible to easily realize correct (R−Y) demodulation.

Figure 2:
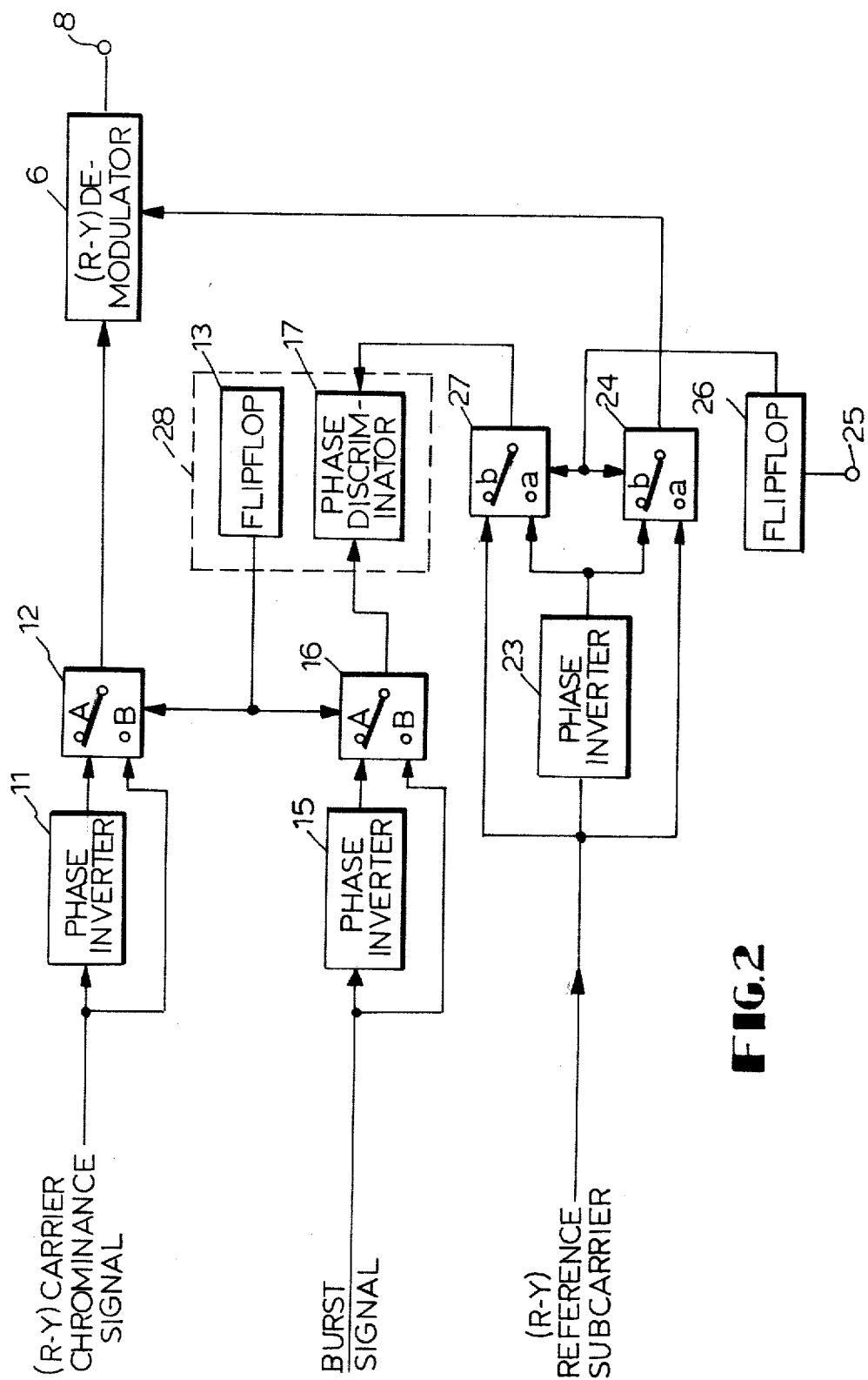
FIG. 2 is a block diagram of only the section relating to this invention in a demodulator circuit using switches in parallel.

Now, in the application example of FIG. 1 discussed above, the reference subcarrier of the output of the third switch 24 is supplied as it is to the phase discriminator 17, which is used to detect matching of polarities. It is also possible to add a fourth switch 27, which operates coupled with the third switch 24, as shown in FIG. 2, so as to extract a reference subcarrier having the same polarity as the output of the third switch 24, apply it to the phase discriminator 17, and compare it with the polarity of the burst signal of the output of the second switch 16. Further, it is possible to add a fourth switch 27, which operates coupled with the third switch 24, to withdraw a reference subcarrier with a polarity reversed from that of the ouput of the third switch, apply it to the phase discriminator 17, and compare it with the polarity of the burst signal of the output of the second switch 16. However, in such a case, it is necessary to set the phase discriminator so that it generates a switching pulse when the polarities of the two inputs are the same. By adding this additional fourth switch 27, there are the following advantages: It becomes possible to form a third switch 24 with a circuit composition similar to the phase inverter 22 when creating a real integrated circuit based on this invention; it becomes possible to deploy switches, supplying the (B−Y) demodulator 5 and (R−Y) demodulator 6, symmetrically in the respective reference subcarrier routes; and it becomes possible to maintain a close phase relationship between each signal.

Now, FIG. 2 shows just the section relating to this invention. Phase inverter 11, the first switch 12, (R−Y) demodulator 6 flipflop 13 and the second switch 16 have the same functions and operations as the respectively numbered blocks shown in FIG. 1. In FIG. 2, the third switch 27 has two input terminals to which are supplied the reference subcarrier of the phase of the (R−Y) axis and the reference subcarrier of the phase of the −(R−Y) axis obtained through the phase inverter 23 and is switched at each horizontal scanning line with the output from the flipflop 25. The reference subcarrier obtained from the third switch 24 is applied to the (R−Y) demodulator 6 and the carrier chrom. signal from the first switch is demodulated. The fourth switch 27 has two input terminals to which are supplied the reference subcarrier of the phase of the (R−Y) axis and the reference subcarrier of the phase of the −(R−Y) axis obtained through the phase inverter 23, and is switched at each horizontal scanning line with the same output as is obtained from flipflop 25 and supplied to the third switch 24. A reference subcarrier having the same phase as the reference subcarrier which is the output of the third switch 24 is produced as output and supplied to the phase discriminator 17. Phase discriminator 17 compares the phases of the burst signal from the second switch 16 and the reference subcarrier from the fourth switch 27 and, when the phases are different, reverses the flipflop 13 once.

In FIG. 2, the output of the phase inverter 23 is supplied to the third switch 24 and the fourth switch 27. Clearly, the same operation is performed by suppling only the third switch 24 with the output from the phase inverter 23 and installing another phase inverter (not shown in fig.) to supply the fourth switch 27. Supplying the third switch 24 and the No. 4 switch 27 with reference subcarriers from separate phase discriminators in this way has the advantage of preserving symmetry when creating a real integrated circuit based on this invention.

Figure 3:
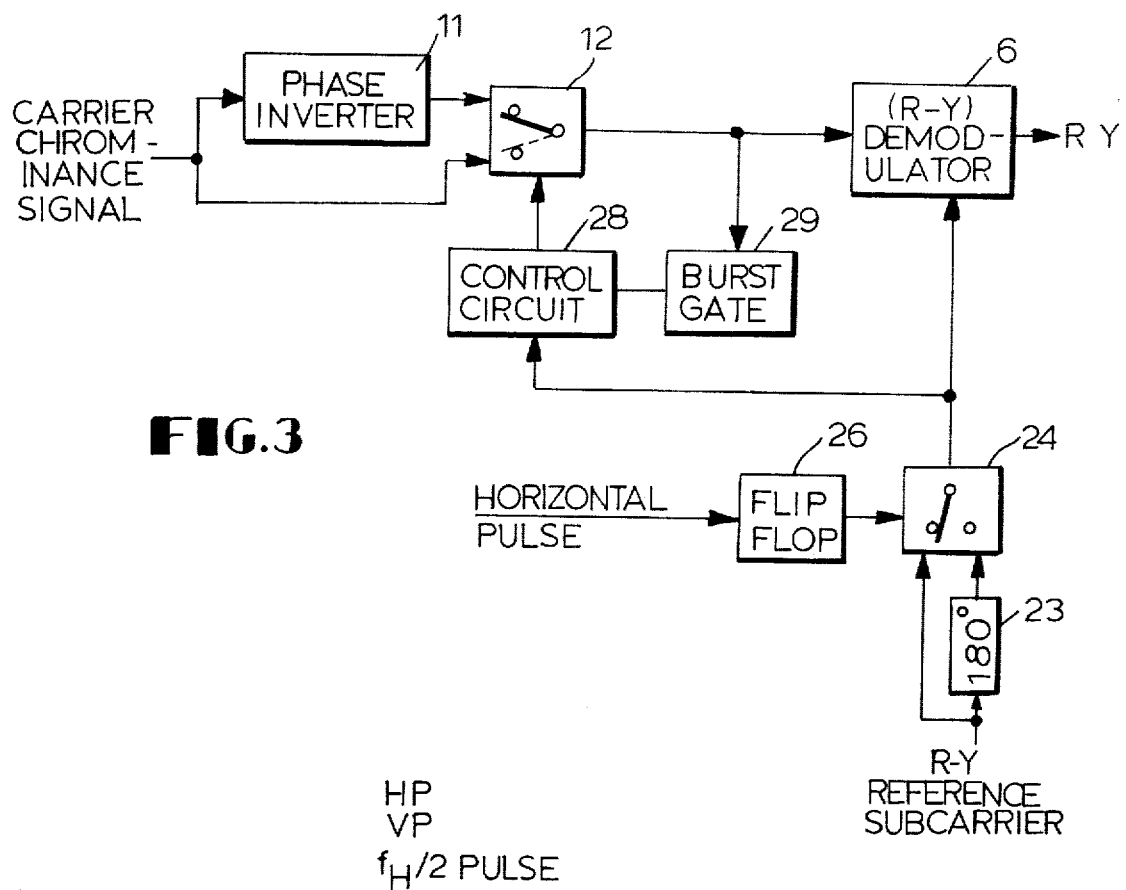
FIG. 3 is a block diagram of a demodulator circuit for color television signals, using both switches for burst signals and for carrier chrominance signals in this invention.
Figure 4:
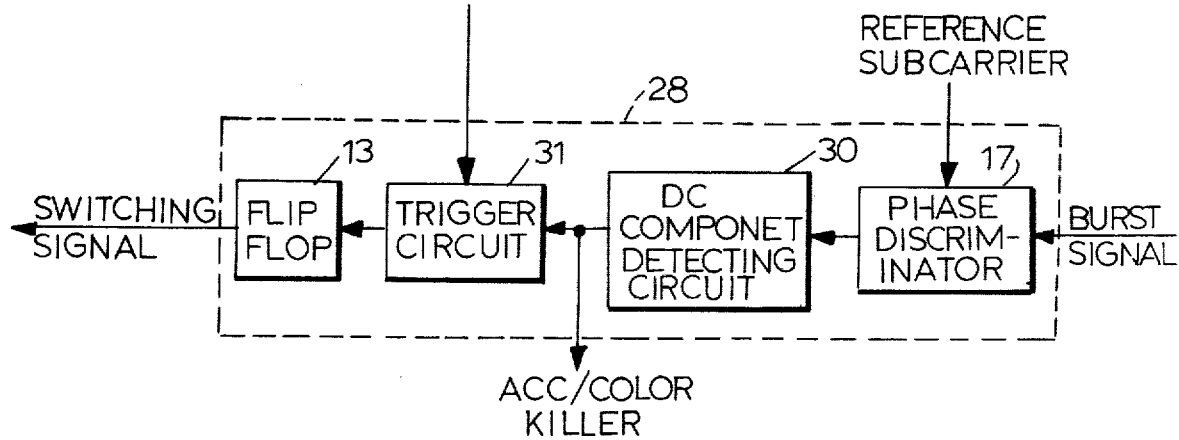
FIG. 4 is a block diagram showing another example of a control circuit using this invention.

FIG. 3 is a block diagram showing another example of the application of this invention. The carrier chrom. signal processed at the well known delay line matrix circuit of the 1H delay line and the difference calculating circuit (neither shown in fig.) (not processed in simple PAL systems, as is well known) is supplied to one of the input terminals of the first switching circuit 12, while the other input terminal is supplied with a carrier chrom. signal reversed in polarity through the phase inverter 11. However, in this case, the burst eliminating circuits 9 and 10 shown in FIG. 1 are assumed not to exist. Therefore, in FIG. 3, a burst signal corresponding to the (R−Y) axis can also be obtained along with the carrier color signal of the (R−Y) axis from the output of the first switch 12. The first switching circuit is controlled by the control signals from the control circuit 28 and its output terminal is supplied with either of the two inputs. The output signal is supplied to the (R−Y) demodulator. On the other hand, one of the two input terminals of the third switch 24 is supplied with the (R−Y) reference subcarrier, i.e. the reference subcarrier having a 90° phase, assuming 180° is the average phase of the PAL alternating bursts. The other input terminal is supplied with a reference subcarrier inverted in polarity by passing through the phase inverter 23, i.e. one having a −90° phase. The third switch 24 is controlled by flipflop 26, which divides the frequency of the horizontal pulse in two and generates an $f_H/2$ line switching signal, and generates as output an (R−Y) reference subcarrier with a phase differing 180° each 1H. However, that phase which changes with each line is not synchronized with the transmission line information sent by the alternating burst signal. In order for the (R−Y) demodulator 6, which demodulates the output of the first switch 12 using the (R−Y) standard subcarrier of the third switch 24, to supply a carrier chrom. signal of the R−Y axis of the correct polarity, the control circuit 28 compares the phases of the burst signal of the output of the first switching circuit 12 from the burst gate 29 with the output of the third switch 24 and controls the first switch 12. A more detailed explanation of the above control circuit 28 is provided below: FIG. 4 shows an example of an application of the control circuit 28. At phase discriminator 17, the alternating burst signal corresponding to the (R−Y) axis and from burst gate 29 is synchronously detected using the (R−Y) reference subcarrier, inverting in polarity every 1H, from the third switch 24. The d.c. component detecting circuit 30 detects the d.c. component of the burst detecting output formed at the low pass filter or peak maintaining circuit. When in a correct phase relationship with the transmission line information, a d.c. signal positive compared to the standard level is obtained and when in a mistaken phase relationship, a d.c. signal negative compared to the standard level is obtained. In order to control the state of the first switch 12 by this information, the trigger circuit 31 and flipflop 13 shown in FIG. 4 are provided. Trigger circuit 31 generates and supplies to flipflop 13 a trigger signal which changes the state of flipflop 13 only when the output of the d.c. component detecting circuit is negative. When the output is positive, the state of the flipflop 13 does not change. By controlling the first switching circuit 12 using the output of the flipflop 13, a continually correct phase relationship can be obtained. The trigger circuit 31 can be realized by a so-called AND circuit, which supplies the horizontal pulse, vertical pulse, or $f_H/2$ line switching signal to the flipflop 13 as trigger signals only when the output of the d.c. component detecting circuit 30 generates a signal indicating negative. The output of the d.c. component detecting circuit 30 can also be used as the well known automatic color gain control signal (ACC signal) of the amplifier (not shown in fig.) of the carrier chrom. signal since it corresponds to the burst signal level. A killer circuit, in which the operation of the color demodulating circuit is stopped, operates at the same time as when the burst signal level drops due to the killer operation being set off when above a certain positive level from the standard level of the output of the d.c. component detecting circuit 30 and also when the state of the first switch 12 is unappropriate and the polarity of the (R−Y) signal output is incorrect. The advantage is that the reproduction of unappropriate colors can be prevented from occurring on the screens of receivers having this circuit.

In FIG. 3, the third switch 24 supplies a reference subcarrier to the (R−Y) demodulator 6 and the control circuit 28. As stated in the explanation of FIG. 2, when creating an integrated circuit based on this invention, a fourth switch the same as FIG. 3 and be provided to ensure symmetricalness for the signal in terms of circuit composition; the reference subcarrier supplied from the third switch 24 to the (R−Y) demodulator 6; and a standard subcarrier, with the same phase as the reference subcarrier obtained at the third switch 24 from the fourth switch, supplied to the phase discriminator inside control circuit 28.

Control circuit 28, mentioned in FIG. 4, can, of course, be used in place of the phase discriminator 17 and flipflop 13 in FIG. 1 and FIG. 2.

As stated above, this invention allows the realization of a completely new demodulator circuit for color television signals—one in which the correct polarity (R−Y) signal can be obtained with just the generation of the $f_H/2$ line switching signal, for which phase control is not exercised.

What is claimed is:

1. A color demodulator circuit for color television signals in the PAL system, comprising:
a (R−Y) demodulator;
a switch means supplied with (1) a carrier chrominance signal in (R−Y) axis, (2) a further carrier chrominance signal the same as said carrier chrominance signal except that the polarity of the latter is reversed from that of the former, (3) a burst signal having (R−Y) axis component, and (4) a further burst signal the same as said burst signal except that the polarity of the latter is reversed from that of the former, said switch means having a switch control terminal supplied with a switch control signal for controlling the switching operation of said switch means, so that said switch means outputs either both of said carrier chrominance signal and said burst signal or both of said further carrier chrominance signal and said further burst signal, the thus outputted carrier chrominance signal and further carrier chrominance signal being fed to an input terminal of said (R−Y) demodulator;
a further switch means supplied with a reference subcarrier in (R−Y) axis and a further reference subcarrier the same as said reference subcarrier except that the polarity of the latter is reversed from that of the former, said further switch means having a switch control terminal supplied with a switching pulse train having a frequency ($f_H/2$) of half of horizontal scanning frequency, so that said further switch means alternately outputs said reference subcarrier and said further reference subcarrier to a further input terminal of said (R−Y) demodulator so as to demodulate the carrier chrominance signal inputted to said (R−Y) demodulator; a control circuit having two input terminals and an output terminal, one input terminal being supplied with said burst signal or said further burst signal from said switch means, the other input terminal being supplied with said reference subcarrier or said further reference subcarrier, said output terminal of said control circuit being coupled to said switch control terminal of said switch means, said control circuit having a discrimination function of discriminate between (a) the phase of said burst signal or said further burst signal from said switch means and (b) the phase of said reference subcarrier or said further reference subcarrier from said further switch means so as to produce, as said switch control signal to said switch means, an output signal having alternative one of two levels for causing an output signal of said (R−Y) demodulator to have a correct polarity.

2. A color demodulator circuit according to claim 1, wherein said switch means comprises: a first switch having two input terminals supplied with said carrier chrominance signal and said further carrier chrominance signal, respectively, and also having a switch control terminal coupled to said switch control terminal of said switch means, so as to output, to said input terminal of said (R−Y) demodulator, either said carrier chrominance signal or said further carrier chrominance signal under the control of said switch control signal; and a second switch having two input terminals supplied with said burst signal and said further burst signal, respectively, and also having a switch control terminal coupled to said switch control terminal of said switch means, so as to output, to said one input terminal of said control circuit, either said burst signal or said further burst signal under the control of said switch control signal.

3. A color demodulator circuit according to claim 1, wherein said further switch means comprises: a third and a fourth switch each having two input terminals supplied with said reference subcarrier and said further reference subcarrier, respectively, and also each having a switch control terminal coupled to said switch control terminal of said further switch means, so that said third switch outputs, to said input terminal of said (R−Y) demodulator, either said reference subcarrier or said further reference subcarrier, and said fourth switch outputs, to said other input terminal of said control circuit, either said reference subcarrier or said further reference subcarrier.

4. A color demodulator circuit according to claim 1, wherein said control circuit comprises: a phase discriminator having said discrimination function; and a flipflop to produce, as said switch control signal to said switch means, an output signal having said alternative one of said two levels.

* * * * *